(12) United States Patent
Fellenstein et al.

(10) Patent No.: US 7,712,100 B2
(45) Date of Patent: May 4, 2010

(54) DETERMINING A CAPACITY OF A GRID ENVIRONMENT TO HANDLE A REQUIRED WORKLOAD FOR A VIRTUAL GRID JOB REQUEST

(75) Inventors: Craig W. Fellenstein, Brookfield, CT (US); Rick A. Hamilton, II, Charlottesville, VA (US); Joshy Joseph, Poughkeepsie, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1583 days.

(21) Appl. No.: 10/940,452

(22) Filed: Sep. 14, 2004

(65) Prior Publication Data

US 2006/0059492 A1    Mar. 16, 2006

(51) Int. Cl.
*G06F 9/46* (2006.01)
*G06F 15/173* (2006.01)
*G06Q 40/00* (2006.01)

(52) U.S. Cl. .................... 718/104; 718/102; 705/37; 709/226

(58) Field of Classification Search ................ 718/100, 718/102, 104; 705/9, 52, 37; 709/226
See application file for complete search history.

(56) References Cited

U.S. PATENT DOCUMENTS

| | | | |
|---|---|---|---|
| 4,591,980 A | 5/1986 | Huberman et al. | 364/200 |
| 5,630,156 A | 5/1997 | Privat et al. | 395/800 |
| 5,640,569 A | 6/1997 | Miller et al. | |
| 5,729,472 A | 3/1998 | Seiffert et al. | |
| 5,905,975 A | 5/1999 | Ausubel | |
| 5,931,911 A | 8/1999 | Remy et al. | 709/223 |
| 6,003,075 A | 12/1999 | Arendt et al. | |
| 6,021,398 A | 2/2000 | Ausubel | |

(Continued)

FOREIGN PATENT DOCUMENTS

EP    0790559 A    8/1997

(Continued)

OTHER PUBLICATIONS

Weng et al. ("A cost-based online scheduling algorithm for job assignment on computational grids", Springer- Verlag Berlin Heidelberg, 2003, pp. 343-351.*

(Continued)

*Primary Examiner*—Meng-Ai An
*Assistant Examiner*—Caroline Arcos
(74) *Attorney, Agent, or Firm*—John Pivnichny; Amy J. Pattillo

(57) ABSTRACT

A method, system, and program for determining a capacity of a grid environment to handle a required workload for a virtual grid job request are provided. A bid controller receives a virtual job request for processing a job within a grid environment from a client system. The bid controller determines the total required workload for the virtual job request. Then, the bid controller calculates a capacity of the grid environment to handle the total required workload, such that a bid for performing the job is enabled to be automatically generated responsive to the virtual job request based on the capacity of the grid environment to handle the total required workload.

6 Claims, 5 Drawing Sheets

U.S. PATENT DOCUMENTS

| | | | |
|---|---|---|---|
| 6,023,612 | A | 2/2000 | Harris et al. |
| 6,167,445 | A | 12/2000 | Gai et al. |
| 6,182,139 | B1 | 1/2001 | Brendel ............... 709/226 |
| 6,310,889 | B1 | 10/2001 | Parsons et al. |
| 6,430,711 | B1 | 8/2002 | Sekizawa |
| 6,460,082 | B1 | 10/2002 | Lumelsky et al. ......... 709/226 |
| 6,480,955 | B1 | 11/2002 | DeKoning et al. |
| 6,552,813 | B2 | 4/2003 | Yacoub |
| 6,647,373 | B1 | 11/2003 | Carlton-Foss |
| 6,654,807 | B2 | 11/2003 | Farber et al. |
| 6,717,694 | B1 | 4/2004 | Fukunaga et al. |
| 6,816,905 | B1 | 11/2004 | Sheets et al. |
| 6,963,285 | B2 | 11/2005 | Fischer et al. |
| 7,050,184 | B1 | 5/2006 | Miyamoto |
| 7,055,052 | B2 | 5/2006 | Chalasani et al. |
| 7,080,077 | B2 * | 7/2006 | Ramamurthy et al. ......... 707/9 |
| 7,093,259 | B2 | 8/2006 | Pulsipher et al. |
| 7,096,248 | B2 | 8/2006 | Masters et al. |
| 7,124,062 | B2 | 10/2006 | Gebhart |
| 7,171,654 | B2 | 1/2007 | Werme et al. |
| 7,181,743 | B2 | 2/2007 | Werme et al. |
| 7,272,732 | B2 | 9/2007 | Farkas et al. |
| 7,293,092 | B2 | 11/2007 | Sukegawa |
| 7,433,931 | B2 | 10/2008 | Richoux |
| 7,451,106 | B1 | 11/2008 | Gindlesperger |
| 7,472,112 | B2 | 12/2008 | Pfleiger et al. |
| 7,533,168 | B1 * | 5/2009 | Pabla et al. ............... 709/224 |
| 7,552,437 | B2 | 6/2009 | Di Luoffo et al. |
| 7,562,143 | B2 | 7/2009 | Fellenstein et al. |
| 7,584,274 | B2 | 9/2009 | Bond et al. |
| 2002/0116488 | A1 | 8/2002 | Subramanian et al. |
| 2002/0152310 | A1 | 10/2002 | Jain et al. ............... 709/226 |
| 2002/0165979 | A1 | 11/2002 | Vincent ............... 709/239 |
| 2003/0036886 | A1 | 2/2003 | Stone |
| 2003/0041010 | A1 | 2/2003 | Yonao-Cowan |
| 2003/0088671 | A1 | 5/2003 | Klinker et al. |
| 2003/0105868 | A1 | 6/2003 | Kimbrel et al. ............ 709/226 |
| 2003/0120701 | A1 | 6/2003 | Pulsipher et al. ........... 709/102 |
| 2003/0126265 | A1 | 7/2003 | Aziz et al. ............... 709/227 |
| 2003/0140143 | A1 | 7/2003 | Wolf et al. ............... 709/225 |
| 2003/0191795 | A1 | 10/2003 | Bernardin et al. ......... 709/105 |
| 2003/0195813 | A1 | 10/2003 | Pallister et al. |
| 2003/0200347 | A1 | 10/2003 | Weitzman ............... 709/310 |
| 2004/0095237 | A1 | 5/2004 | Chet et al. |
| 2004/0098606 | A1 | 5/2004 | Tan et al. |
| 2004/0145775 | A1 | 7/2004 | Kubler et al. |
| 2004/0213220 | A1 | 10/2004 | Davis |
| 2004/0215590 | A1 | 10/2004 | Kroening |
| 2004/0225711 | A1 * | 11/2004 | Burnett et al. ............ 709/201 |
| 2005/0021349 | A1 | 1/2005 | Cheliotis et al. |
| 2005/0021742 | A1 | 1/2005 | Yemini et al. |
| 2005/0027691 | A1 | 2/2005 | Brin et al. |
| 2005/0044228 | A1 | 2/2005 | Birkestrand et al. |
| 2005/0065994 | A1 | 3/2005 | Creamer et al. |
| 2005/0132041 | A1 | 6/2005 | Kundu |
| 2005/0138162 | A1 | 6/2005 | Byrnes |
| 2005/0138175 | A1 | 6/2005 | Kumar et al. |
| 2005/0182838 | A1 | 8/2005 | Sheets et al. |
| 2005/0187797 | A1 | 8/2005 | Johnson |
| 2005/0187977 | A1 | 8/2005 | Frost |
| 2005/0188088 | A1 * | 8/2005 | Fellenstein et al. ......... 709/226 |
| 2006/0069621 | A1 | 3/2006 | Chang et al. |
| 2006/0075041 | A1 | 4/2006 | Antonoff et al. |
| 2006/0075042 | A1 | 4/2006 | Wang et al. |
| 2006/0149652 | A1 * | 7/2006 | Fellenstein et al. ............ 705/35 |
| 2006/0288251 | A1 | 12/2006 | Jackson |
| 2006/0294218 | A1 | 12/2006 | Tanaka et al. |

FOREIGN PATENT DOCUMENTS

EP      1267552 A      12/2002

OTHER PUBLICATIONS

Andrade et al. ("Our grid: An approach to easily assemble grids with equitable resource sharing", Springer-Verlag Berlin Heidelberg, 2003, pp. 61-86.*

Chase, JS et al, "Dynamic Virtual Clusters in a Grid Site Manager", High Performance Distributed Computing 2003. Proceedings. 12th IEEE International Symposium, Jun. 22-24, 2003, Piscataway, N J, USA, IEEE, pp. 90-100.*

Rolia, Jerry et al, "Service Centric Computing—Next Generation Internet Computing", 2002, Springer-Verlag Berlin Heidelberg, pp. 463-479.

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Foster et al.; The Anatomy of the Grid, Enabling Scalable Virtual Organizations; 2001; available at www.globus.org/research/papers/anatomy.pdf as of Nov. 27, 2003.

Foster et al.; The Physiology of the Grid, An Open Grid Services Architecture for Distributed Systems Integration; Jun. 22, 2002; available at www.globus.org/research/papers/ogsa.pdf as of Nov. 27, 2003.

Foster, Ian; What is the Grid? A Three Point Checklist; Jul. 20, 2002; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; Sep. 2003; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; 2002; available at www.redbooks.ibm.com/redpapers/pdfs/redp3613.pdf as of Nov. 27, 2003.

Jacob, Bart; IBM Grid Computing—Grid Computing: What are the key components?; Jun. 2003; available at www-106.ibm.com/developerworks/grid/library/gr-overview/ as of Nov. 27, 2003.

Unger et al.; IBM Grid Computing—A Visual Tour of Open Grid Services Architecture; Aug. 2003; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

IBM Research Disclosure, "Process and Method for IT energy optimization", Feb. 2002, n454196 p. 366.

Zhu et al., "Scheduling Optimization for resource-intensive Web requests on server clusters", ACM Symposium on Parallel Algorithms and Architectures, 1999, p. 13-22.

Rumsewicz et al, "Preferential Load Balancing for Distributed Internet Servers", Cluster Computing and the Grid, Proceedings. First IEEE/ACM International Symposium, May 2001, p. 363-370.

Kim et al., "Request Rate adaptive dispatching architecture for scalable Internet Server", Cluster Computing, 2000, Proceedings. IEEE conference on Nov. 28-Dec. 1, 2000, p. 289-296.

Casalicchio et al, "Scalable Web Clusters with Static and Dynamic Contents", Cluster Computing, 2000, Proceedings. IEEE conference on Nov. 28-Dec. 1, 2000, p. 170-177.

Fox et al, "Cluster-based scalable network services", Oct. 1997 ACM SIGOPS Operating Systems Review, Proceedings of the 16th ACM symposium on operating systems principles, vol. 31, Issue 5, p. 78-91.

Bodhuin et al, "Using Grid Technologies for Web-enabling Legacy Systems", Research Centre on Software Technology, available at http://www.bauhaus-stuttgart.de/sam/bodhuin.pdf as of at least Jun. 21, 2004.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/ IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/ IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100, submitted in PTO form 892.

Office Action, U.S. Appl. No. 11/031,403, filed Jan. 6, 2005, Mailed Apr. 24, 2009.

Office Action, U.S. Appl. No. 11/031,426, filed Jan. 6, 2005, Mailed Apr. 1, 2009.

Notice of Allowance, U.S. Appl. No. 10/868,542, filed Jun. 15, 2004, Mailed Apr. 16, 2009.

Office Action, U.S. Appl. No. 11/767,502, filed Jun. 23, 2007, Zhendong Bao, Mailed Jun. 25, 2009, pp. 1-14.

Office Action, U.S. Appl. No. 12/211,243, filed Sep. 16, 2008, Di Luoffo et al, Mailed Aug. 12, 2009, pp. 1-8.

Office Action, U.S. Appl. No. 11/031,542, filed Jan. 6, 2005, Dawson et al, Mailed Jul. 7, 2009, p. 1-15.

Cao et a "Grid Flow: Workflow Management for Grid Computing", Cluster Computing and the Grid, 2003, Proceedings. CCGrid 2003. 3rd IEEE/ACM International Symposium on : Publication Date May 12-15, 2003.

Moore et al, "Managing Mixed Use Clusters with Cluster on Demand", Duke University, Nov. 2002.

"IBM Girds for Grids". McConnell, Chris. Enterprise System Journal, Oct. 2001, 1 page.

"Grid Computing set for big growth". Tanner, John, America's Network, vol. 107, No. 8, May 15, 2003, 6 pages.

Office Action, U.S. Appl. No. 12/125,892, filed May 22, 2008, mailed Aug. 26, 2009.

Office Action, U.S. Appl. No. 12/125,879, filed May 22, 2008, mailed Sep. 15, 2009.

Notice of Allowance, U.S. Appl. No. 12/194,989, filed Aug. 20, 2008, mailed Sep. 30, 2009.

Office Action, U.S. Appl. No. 11/031,426, Filed Jan. 6, 2005, Carl Philip Gusler et al, Mailed Nov. 13, 2009, 21 pages.

Notice of Allowance, U.S. Appl. No. 11/031,403, Filed Jan. 6, 2005, Leslie Mark Ernest et al., Mailed Oct. 5, 2009, 15 pages.

In re Vincent Valentino Di Luoffo, Notice of Allowance, U.S. Appl. No. 12/211,243, filed Sep. 16, 2003, mail date Dec. 31, 2009, 18 pages.

In re Fellenstein, Final Office Action, U.S. Appl. No. 11/031,490, filed Jan. 6, 2005, mail date Dec. 28, 2009, 21 pages.

In re Fellenstein, Final Office Action, U.S. Appl. No. 12/364,469, filed Feb. 2, 2009, mail date Jan. 5, 2010, 27 pages.

In re Fellenstein, Supplemental Notice of Allowance, U.S. Appl. No. 12/364,469, filed Feb. 2, 2009, mail date Jan. 19, 2010, 7 pages.

In re Fellenstein, Notice of Allowance, U.S. Appl. No. 11/031,542, filed Jan. 6, 2005, mail date Dec. 8, 2009, 35 pages.

* cited by examiner

DETERMINING A CAPACITY OF A GRID ENVIRONMENT TO HANDLE A REQUIRED WORKLOAD FOR A VIRTUAL GRID JOB REQUEST

BACKGROUND OF THE INVENTION

1. Technical Field

The present invention relates in general to improved grid computing and in particular to automated bidding for virtual job requests within a grid environment. Still more particularly, the present invention relates to responding to virtual grid job requests for grid resources by calculating the capacity of grid resources to handle the workload requirements for the virtual requests, where a bid for handling the virtual job request can be generated based on the capacity of the grid environment to handle the workload requirements.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

One important application of a grid environment is that companies implementing an enterprise computing environment can access external grid computing "farms". Sending jobs to a grid computing farms is one way to outsource job execution. The grid computing farms may include groups of grid resources accessible for executing grid jobs received from multiple customers.

A limitation of current grid computing farms is that the process for attaining bids from multiple grid computing farms is time consuming and inefficient. In particular, a customer needing to send jobs to a grid computing farm will typically want the least costly grid computing farm from among multiple available grid farm providers to process the grid jobs. However, to determine the most competitive bid from among the multiple available grid farm providers, a customer must contact a representative of each grid computing farm, provide a description of the type of grid resources needed and receive a bid from the representative of each grid farm. Requiring a customer to contact a representative of each grid computing farm and go through a bidding process is inefficient for the customer and for the grid computing farm vendor.

Therefore, in view of the foregoing, it would be advantageous to provide a method, system, and program for receiving virtual grid job requests and automatically calculating a bid for performing the grid job, such that the consumer and the grid resource vendor can more efficiently determine whether a particular grid environment is able to handle a virtual grid job request and provide on the spot prices for use of a grid environment. In particular, it would be advantageous to provide a method, system, and program for calculating the workload associated with a virtual grid job request so that an accurate determination of the ability of the grid environment to handle a virtual grid job request is quickly determines and a price can be calculated based on the estimated workload of the virtual grid job request.

SUMMARY OF THE INVENTION

In view of the foregoing, the present invention in general provides for automation for access to grids and in particular provides for automated bidding for virtual job requests within a grid environment. Still more particularly, the present invention relates to responding to virtual grid job requests for grid resources by calculating the capacity of grid resources to handle the workload requirements for the virtual requests, where a bid for handling the virtual job request can be generated based on the capacity of the grid environment to handle the workload requirements.

According to one embodiment, a bid controller receives a virtual job request for processing a job within a grid environment from a client system. The bid controller determines the total required workload for the virtual job request. Then, the bid controller calculates a capacity of the grid environment to handle the total required workload, such that a bid for performing the job is enabled to be automatically generated responsive to the virtual job request based on the capacity of the grid environment to handle the total required workload.

The bid controller may be a resource within or outside the grid environment for which a bid is determined in response to receiving a virtual job request. The bid controller may determine bids for multiple grid environments or a single grid environment.

In calculating the total required workload for the virtual job request, the bid controller may calculate a total time available for the job to execute within the grid environment, for accessing data required for the job, and for returning a result of the job from the grid environment to a client system. In addition, as part of the total required workload, the bid controller may calculate a total resource requirement for processing the job, such as a hardware resource requirement, a software resource requirement, or a network resource requirement.

In calculating the capacity of the grid environment to handle the total required workload, the bid controller may determine a selection of available resources from among the multiple resources available to the grid environment that are authorized to handle the virtual job request. In particular, in adding resource to the selection of available resources, the bid controller determines whether the virtual job request authorizes use of resources available from outside the grid environment or capacity on demand resources.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
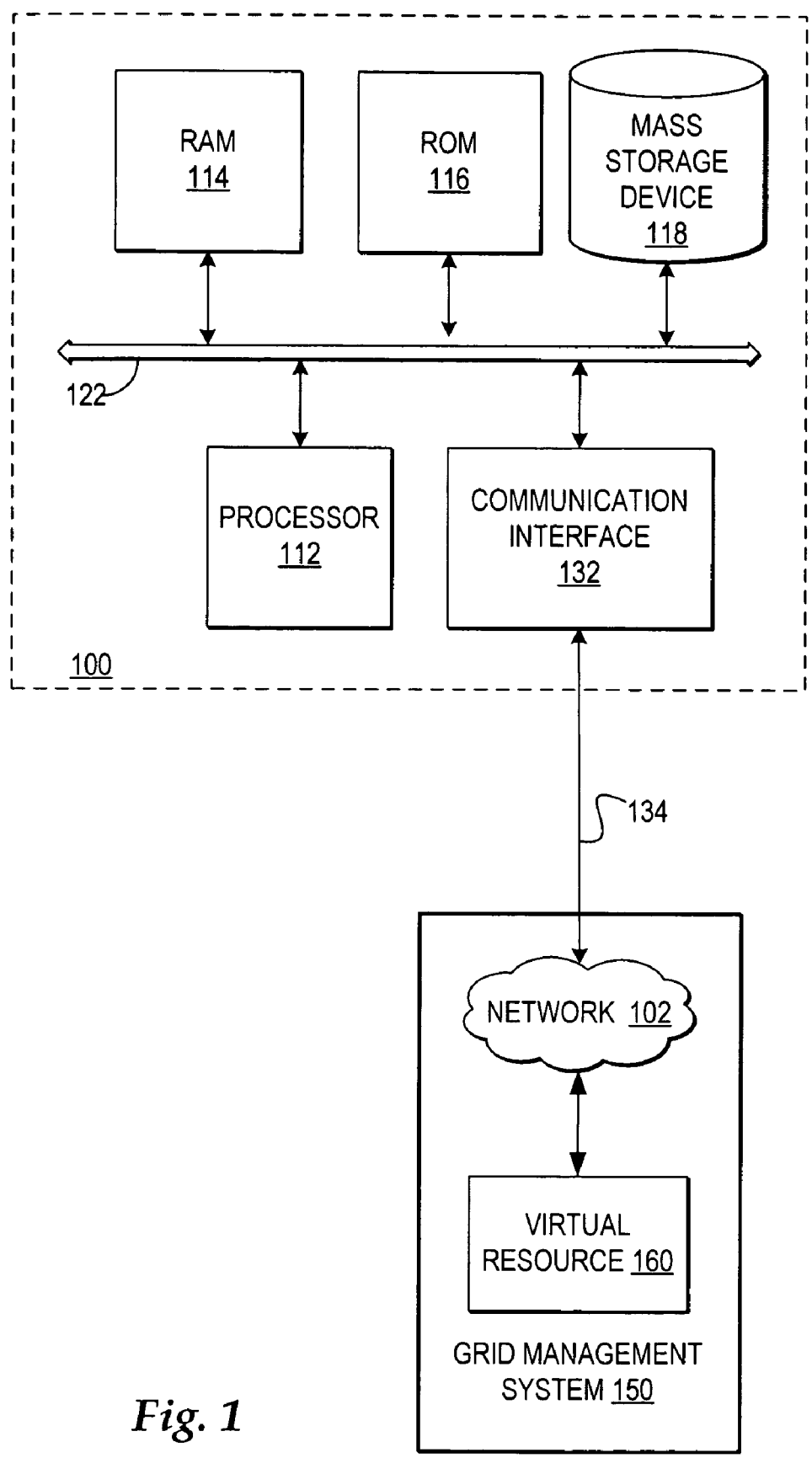
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIG. 7 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
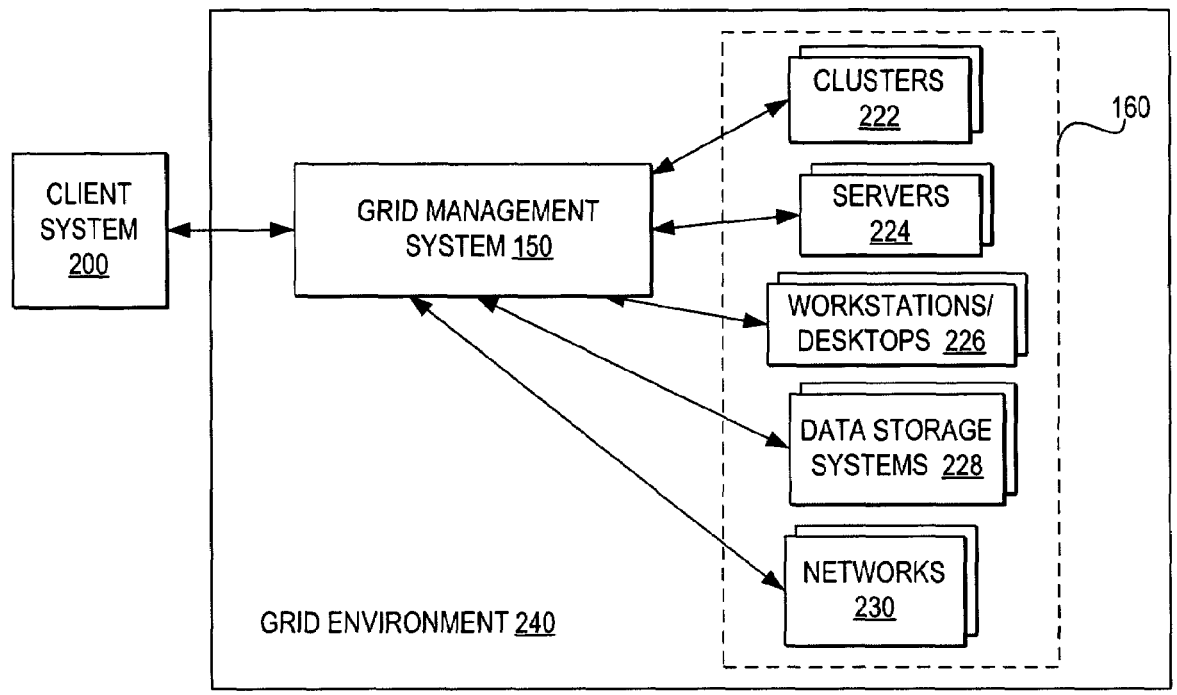
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems. In addition, it will be understood that grid environment 240 may be provided by a grid vendor, where a cost for use of resources within grid environment 240 may be calculated based on the amount of time required for a grid job to execute or the actual amount of resources used, for example.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send virtual job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

One function of grid management system 150 is to manage virtual job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

In one example, a grid service is invoked when grid management system 150 receives a virtual job request that specifies the parameters for processing a job. The grid service is a bid controller that determines a total workload required for the virtual job request and calculates a capacity of grid environment 240 to handle the total workload required. The bid controller also determines a bid for performing the job specified by the virtual job request based on the capacity of grid environment 240 to handle the total workload required.

Figure 3:
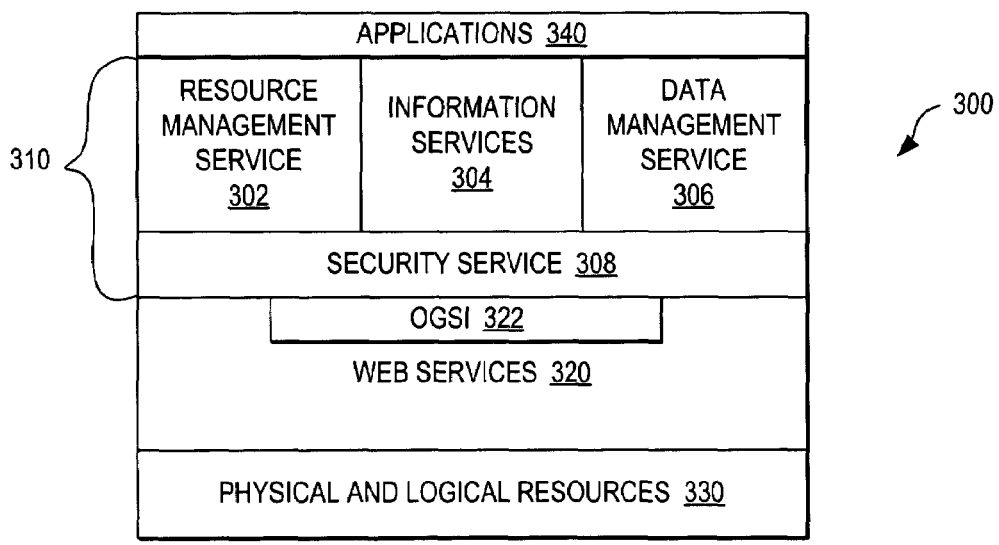
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
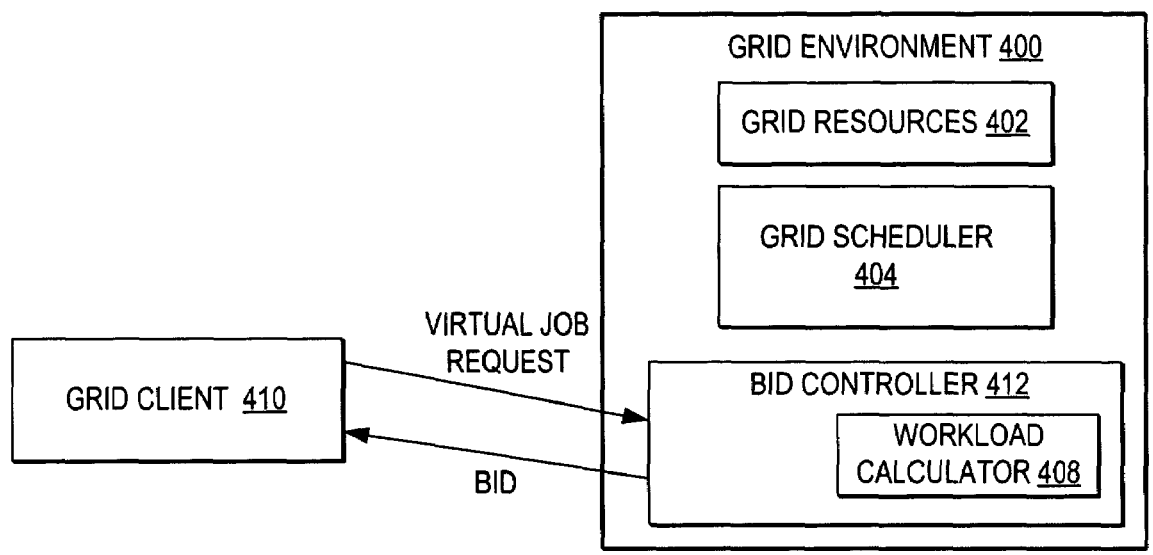
FIG. 4 is a block diagram depicting a grid environment in which virtual job requests are received and automatically replied to in the form of a bid in accordance with the method, system, and program of the present invention.

With reference now to FIG. 4, there is depicted a block diagram of a grid environment in which virtual job requests are received and automatically replied to in the form of a bid in accordance with the method, system, and program of the present invention. As depicted, a grid client sends virtual job requests to a grid environment 400. Grid environment may logically include a grid scheduler 404, grid resources 402, and a bid controller 412. Grid resources 402 represent the available resources providing grid services within grid environment 400 and a grid scheduler 404 controls distribution of jobs to grid resources 402. It will be understood that grid resources 402, grid scheduler 404, and bid controller 412 may execute among multiple server systems distributed within a single network or among multiple networks.

Bid controller 412, which handles receiving virtual jobs requests and generating bids for completion of the job specified by a virtual job request, may be called as a grid service within grid environment 400. Alternatively, virtual job requests may be passed to bid controller 412 from the transport layer or other gatekeeping function of grid environment 400. Further, bid controller 412 may execute within a system external to grid environment 400.

In one embodiment, bid controller 412 includes a workload calculator 408. Workload calculator 408 determines the likely workload required by each virtual job request and calculates the capacity of grid environment 400 to handle the required workload. Based on the capacity of grid environment 400 to handle the required workload, a cost for performing the job specified by the virtual job request can be estimated by bid controller 412 and returned to grid client 410 in the form of a bid.

While in the embodiment depicted bid controller 412 is illustrated handling receipt of virtual job requests and automatic determination and return of bids for processing jobs within grid environment 400, it will be understood that bid controller 412 may handle receipt of virtual job requests from multiple grid clients and returns bids for processing jobs within multiple grid environments.

Figure 5:
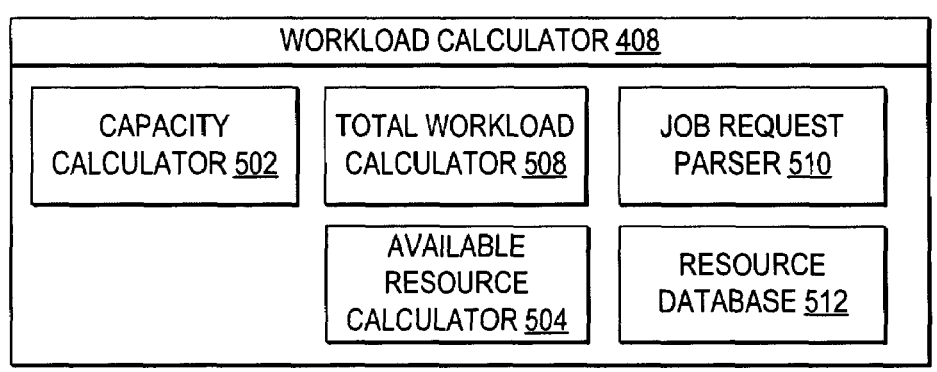
FIG. 5 is a block diagram depicting one embodiment of a workload calculator in accordance with the method, system, and program of the present invention.

Referring now to FIG. 5, there is depicted a block diagram of one embodiment of a workload calculator in accordance with the method, system, and program of the present invention. As depicted, workload calculator 408 includes a job request parser 510. Job request parser 510 receives each virtual job request and may hold the virtual job request in a queue until processing can be performed. Job request parser 510 may translate values specified by a user in the virtual job request into a unit specified for use in workload calculations.

A resource database 512 includes a listing of each resource available within the grid environment. In particular, for each resource listing, resource database 512 may further specify the type of resource, which clients have access to the resource, the resource performance specifications, and the resource platform characteristics. In addition, resource database 512 may include a listing of resources available to the grid environment from outside the grid environment.

An available resource calculator 504 may filter through the available resource database 512 to determine which resources are available for a virtual job request. In particular, as will be further described with reference to FIG. 6, a virtual job request may limit the amount of resources that can be used and may limit whether capacity on demand resources or resources outside the grid environment can be used.

A total workload calculator 508 may calculate a total workload required for the job specified by the virtual job request. In particular, total workload calculator 508 may determine a total resource requirement and time requirement for a virtual job request. As will be further described with reference to FIG. 6, the total resource requirement may specify the total amount of hardware, software, or network resources, for example, needed for completion of a job. In addition, as will be further described with reference to FIG. 6, the total time requirement may specify the time available for executing the job within the grid environment, the time available for accessing data required for the job, and the time available for returning a result of the job from the grid environment to a client system. In addition, total workload calculator 508 may determine other parameters that describe the total workload from additional values specified in a virtual job request.

A capacity calculator 502 compares the total workload required for a virtual job request with the resources available for the virtual job request and determines the capacity of the grid environment to handle the job specified by the virtual job request. In particular, capacity calculator 502 may determine whether the grid environment can meet the resource and latency requirements. If the resource and latency requirements of the virtual job request can be met within the grid environment, then capacity controller 502 determines a total workload factor that can be used by a cost calculator to determine a cost for workload requirement. The workload factor may also indicate the estimated performance available for the job. A bid returned to the client system may include a bid cost and the estimated performance available. In some cases, if the grid environment cannot meet the specific requirements of the virtual job request, but could meet a selection of the virtual job request requirements, then the estimated performance available may indicate the deviation from the virtual job request requirements.

Figure 6:
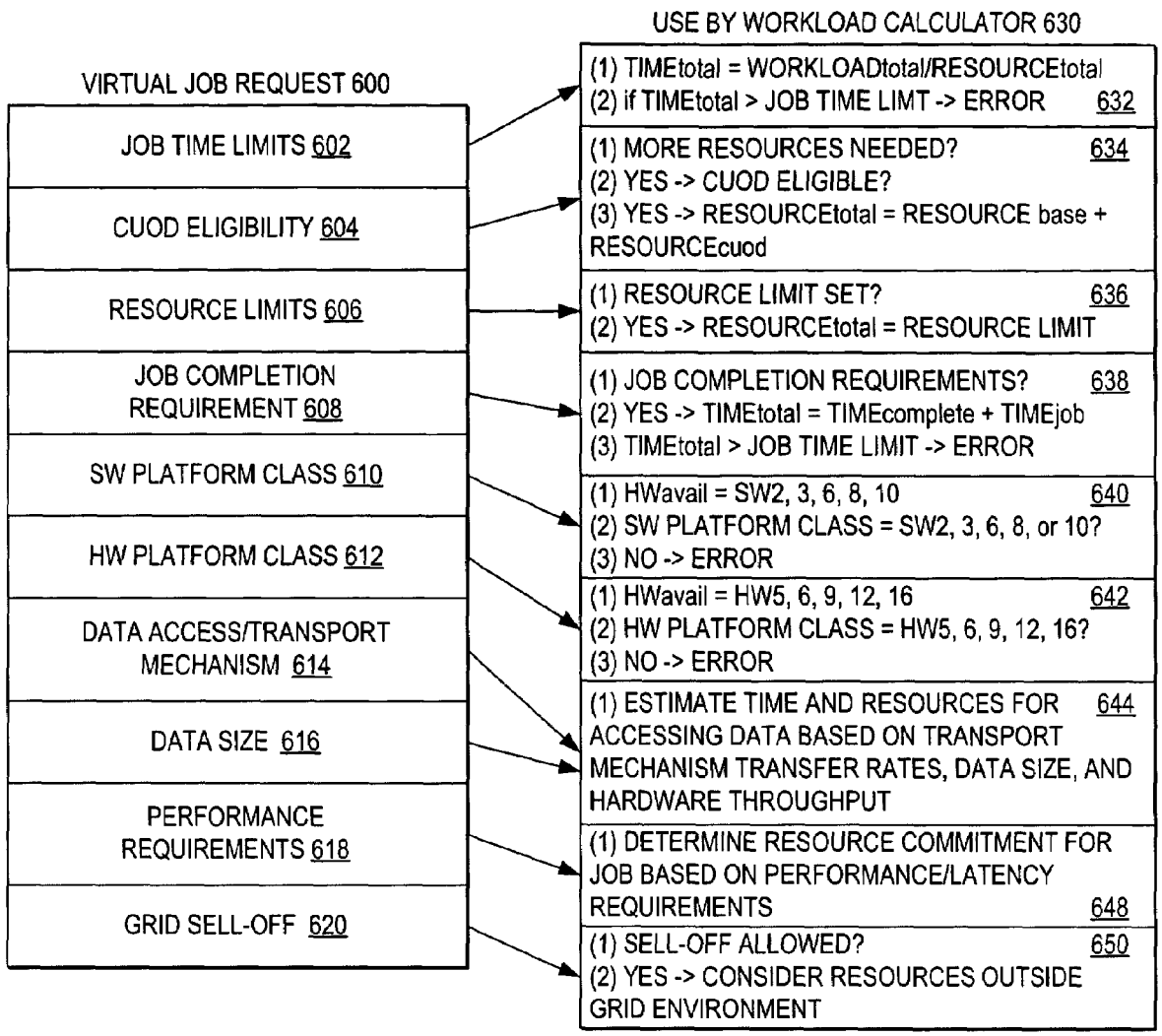
FIG. 6 is an illustrative example depicting calculations performed within the workload calculator based on a virtual job request in accordance with the method, system, and program of the present invention.

With reference now to FIG. 6, there is depicted an illustrative example of calculations performed within the workload calculator based on a virtual job request in accordance with the method, system, and program of the present invention. As depicted, a virtual job request 600 includes multiple values designated for specifying the performance requirements for completing a grid job associated with the virtual job request. A table indicated at reference numeral 630 includes multiple entries that describe calculations that the workload calculator may perform based on the values in virtual job request 600. It is important to note that while the following description broadly references steps performed by the workload calculator, the sub-calculators within the workload calculator may actually perform one or more of the calculations and evaluations described. Further, it will be understood that the values depicted in virtual job request 600 are illustrative of the types of values that may be included in a virtual job request for enabling a bid controller to automatically determine the workload and cost associated with performing a requested job. In addition, it will be understood that the functions depicted in the table indicated at reference numeral 630 are merely illustrative examples of the types of functions that may be performed by the workload calculator.

As illustrated at reference numeral 602, a "job time limit" may be specified that indicates the total time for completion of a job or a specific time by which a job must be completed, for example. The workload calculator may use the "job time limit" to determine whether or not the grid environment has the capacity, in the form of the necessary quantity and type of resources needed, to execute the job in the time specified in the "job time limit." In particular, as indicated at reference numeral 630, the workload calculator may first estimate the total time required to perform the job within the grid environment (TIMEtotal) and then compare that estimated total time with the "job time limit" specified at reference numeral 602. In estimating the total time required to perform the job within the grid environment, the total workload (WORKLOADtotal) required may first be calculated. Then, to calculate the total time required to perform the job, the total workload required may be divided by the total resources (RESOURCEtotal) available to handle the workload. If the total time required for performance of the job is greater than or equal to the "job time limit" than an error is returned indicating that the job cannot be processed within the "job time limit." It is important to note that the total resources available may be constrained by other settings in RFP 600, such as whether capacity on demand resources may be used or whether resource limits within the grid environment are imposed.

As depicted at reference numeral 604, a "capacity on demand (CUOD) eligibility" may be specified indicates whether CUOD resources available to the grid environment can be accessed to perform the job. Further, the CUOD eligibility may specify a limit and type of CUOD resources eligible to execute the job. The workload calculator may check the "CUOD eligibility" if the workload calculator determines that the current grid capacity is not sufficient to run the job and in determining the resources available for the virtual job request. In one example, as depicted at reference numeral 632, if the workload calculator determines that more resources are needed to perform the job, then the workload calculator looks to see if CUOD eligibility is set to "yes" and if so, adds the available CUOD resources (RESOURCEcuod) to the grid resources (RESOURCEbase) to calculate the total available resources to perform the job (RESOURCEtotal).

As illustrated at reference numeral 606, a "resource limit" may specify whether there is a limit on the available resources that can be used to perform a job. The workload calculator may check the "resource limit" value to set the total resources available for handling a job. In particular, as depicted at reference numeral 634, if "resource limit" is set, then the total resources available (RESOURCEtotal) is set to the "resource limit".

As illustrated at reference numeral 608, a "job completion requirement" value may be specified that indicates additional requirements for completing a job. For example, if a job is for a database and completion of the job requires output in the form of a new data mart transferred to a client system, then the "job completion requirements" may specify the time required for return of the data mart to the client system. Thus, as illustrated at reference numeral 636, the workload calculator may use the "job completion requirements" (TIMEcomplete) of additional time requirements, storage requirements, processing requirements, and network bandwidth requirements to specify the total time (TIMEtotal) required to complete a job in addition to the time calculated to complete the job itself within the grid environment (TIMEjob). Further, the workload calculator may return an error if the total time required for completion of the job is greater than the time limit.

As depicted at reference numeral 610, a "software platform class" may specify the software platform class of a job. In one example, software platform classes may be specified by defined numbers. For example, an interactive software class may be specified as SW2 and a web hosting application may be specified as SW3. In general, the workload calculator may use the specified software platform class to determine the likely application characteristics of the job. More specifically, as depicted at reference numeral 640, the workload calculator may use the defined software platform class to determine whether the grid environment has hardware to support the software class. In particular, it is important for the workload calculator to determine whether the job is a batch or interactive because various hardware platforms vary in suitability for software platform types. For example, a zSeries processor may be more efficient for interactive jobs, whereas a pSeries processor may be more efficient for web hosting applications. (zSeries and pSeries are registered trademarks of International Business Machines Corporation).

As illustrated at reference numeral 612, a "hardware platform class" may specify the hardware platform class of a job. In one example, hardware platform classes may be specified by defined numbers. In general, the workload calculator may use the hardware platform class value to determine which grid hardware is available for the job and the throughput characteristics of the hardware type required for the job. More specifically, as depicted at reference numeral 642, the workload calculator may use the defined hardware platform class to determine whether the preferred hardware platform class is available in the grid environment. If a hardware platform class is not specified at reference numeral 612, then the workload calculation module may attempt to select the most efficient hardware class based on other specified job characteristics. For example, if a database application is run for a job, and the grid contains preconfigured pSeries 650 nodes running the database application, then the pSeries 650 nodes would be the preferred hardware.

As depicted at reference numeral 614, a "data access and transport mechanism" value may specify the movement of or access to data that is required for a job. The workload calculator may use the "data access and transport mechanism" value with the data size to determine the time and resources associated with any necessary movement of or access to data. For example, as depicted at reference numeral 644, the virtual job request may specify in the "data access and transport mechanism" that the grid manager acquire data from the client using the WebFTP application. The workload calculator then evaluates the time and resources required to acquire data from the client using the WebFTP application, taking into account the application transfer rates in conjunction with the data size and hardware throughput.

As illustrated at reference numeral 616, a "data size" may be specified for a job. The workload calculator may use the data size in calculating the resources required and time required for the data access specified at reference numeral 614, as described in the example depicted at reference numeral 644. In one example, if no value is specified for the "data size" then the workload calculator may assume that no data transfer is required for the execution of the job.

As depicted at reference numeral 618, a "performance and latency requirement" may be specified that indicates the performance and latency requirements for a job. As depicted at reference numeral 648, the workload calculator may use the "performance and latency requirement", along with other values, to determine the resource commitment required for a job. For example, a job with no specific performance requirements may require fewer resources, in quantity and relative power, than an interactive job requiring a response to users in under a second. In another example, if a latency value is specified at reference numeral 618, then the latency value is compared with specifications of the hardware platform available within the grid environment. More specifically, industry standards such as Standard Performance Evaluation Corporation Integer (SPECint) or SPEC floating point (SPECfp) can be compared with the latency value, or calculations could be made based on other combined RFP submission data such as hardware platform class or job completion limits.

In addition, as depicted at reference numeral 620, a "grid sell-off" indicator may be specified to indicate whether the grid workload calculator can consider use of resources outside the grid environment to meet the requirements for the job, as depicted at reference numeral 650. In one example, if a client does wants a single grid resource vendor to be responsible for data security and job results, the client may not enable a grid sell-off.

Figure 7:
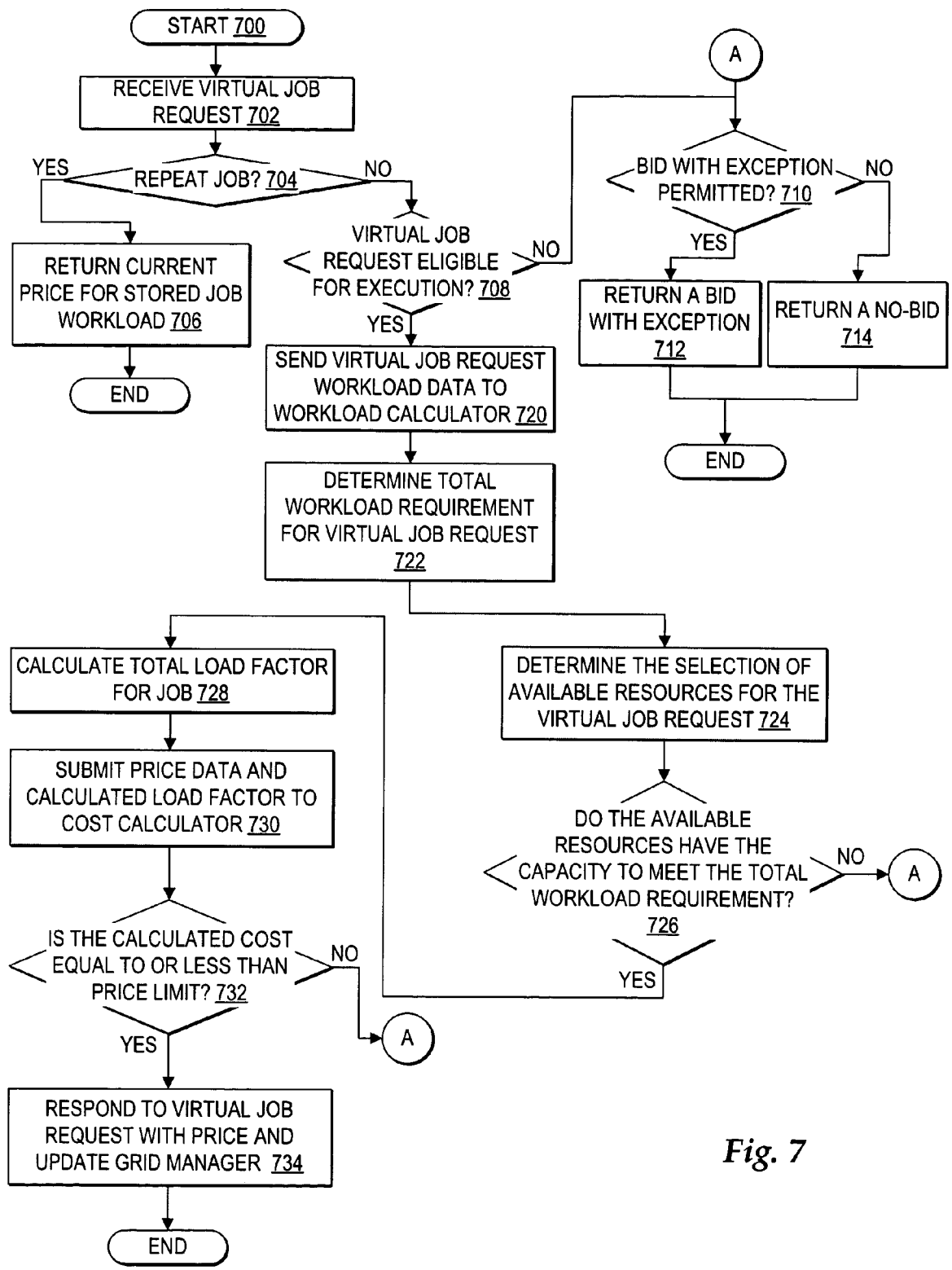
FIG. 7 is a high level logic flowchart depicting a process and program for responding to a virtual job request by calculating a workload required for the request and returning a bid based on the workload required in accordance with the method, system, and program of the present invention.

Referring now to FIG. 7, there is depicted a high level logic flowchart of a process and program for responding to a virtual job request by calculating a workload required for the request and returning a bid based on the workload required in accordance with the method, system, and program of the present invention. As depicted, the process starts at block 700 and thereafter proceeds to block 702. Block 702 depicts receiving a virtual job request. Next, block 704 depicts a determination whether the virtual job request is a repetition of a prior job request. If the virtual job request is for a repetitive job, then the process passes to block 706. Block 706 depicts returning the current price for the stored job workload determined based on the prior job request, and the process ends. Otherwise, at block 704, if the virtual job request is not for a repetitive job, then the process passes to block 708.

Block 708 depicts a determination whether the virtual job request is eligible for execution. In particular, a determination of eligibility may be made from non-performance virtual job request characteristics. If the virtual job request is not eligible for execution, then the process passes to block 710. Block 710 depicts a determination whether it is permissible to submit a bid with exceptions. If it is not permissible, then the process passes to block 714. Block 714 depicts returning a no-bid in response to the virtual job request, and the process ends. Otherwise, at block 710, if it is permissible, then the process passes to block 712. Block 712 depicts returning a bid with an exception, and the process ends.

Returning to block 708, if the virtual job request is eligible for execution, then the process passes to block 720. Block 720 depicts parsing the virtual job request for workload related values. Next, block 722 depicts determining the total workload requirement for the virtual job request. Next, block 724 depicts determining the selection of available resources for the virtual job request. Thereafter, block 726 depicts a determination whether the available resources have the capacity to meet the total workload requirement. If the available resources do not have the capacity, then the process passes to block 710. If the available resources do have the capacity, then the process passes to block 728.

Block 728 depicts calculating the total load factor for the job. In particular, the total load factor may include multiple types of values, such as total resource usage, total time usage, or other indicators of the total workload. Next, block 730 depicts submitting price data and calculated load factor to the cost calculator. Thereafter, block 732 depicts a determination whether a cost calculated based on the load factor is less than or equal to the price limit. If the cost is not less than or equal to the price limit, then the process passes to block 710. If the cost is less than or equal to the price limit, then the process passes to block 734. Block 734 depicts responding to the virtual job request with the price and updating the grid manager with the price response, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for determining a capacity of a grid environment to handle a job specified by a virtual job request, comprising:

receiving, from a client system, a virtual job request for processing a job within a grid environment at a bid controller via a network, wherein said grid environment comprises a plurality of hardware resources, a plurality of software resources, and a plurality of network resources accessed from across a plurality of computing systems with each of said plurality of computing systems communicatively connected over said network through a grid management system to share said plurality of resources through a plurality of grid services, wherein said virtual job request specifies a job time limit which is a time limit for executing said job, an on demand eligibility of said job specifying an eligibility for execution on capacity on demand resources within said grid environment, a resource limit which is a limit on the amount of resources to allocate to said job, a job completion requirement specifying whether the job time limit includes the time to return data output from said job to said client system, a software platform requirement of at least one required software platform class for said job from among a plurality of software platform classes available within said grid environment, a hardware platform requirement of at least one hardware class for said job from among a plurality of hardware platform classes available within said grid environment, a specified transport mechanism with a minimum transfer rate for data accesses for said job, a minimum data size for data processing of said job, a performance requirement for said job, and a grid sell off eligibility specifying whether sell off of said job to another grid environment is allowed;

determining by a total workload calculator a total resource requirement for said job from said job request of at least one required hardware resource, at least one required software resource, and at least one required network resource;

determining by an available resource calculator, a total available resources of a selection of resources currently available within said grid environment meeting said software platform requirement, said hardware platform requirement, said specified transport mechanism, said minimum data size, and said performance requirement for said job request from among said plurality of resources specified in a resource database specifying each type of resource, each resource performance specification, and each resource platform class from among said plurality of software classes and said plurality of hardware classes;

responsive to said total resource requirement requiring more resources than available in said total available resources and said on demand eligibility of said job set to allow capacity on demand resources, adding a selection of available capacity on demand resources within said grid environment to said total available resources;

responsive to said total resource requirement requiring more resources than available in said total available resources and said grid sell off eligibility set to allow sell off to another grid environment, updating the total available resources with a selection of resource available if the virtual grid job is sold off to the another grid environment for processing;

responsive to said total available resources exceeding said resource limit, limiting said total available resources by said resource limit;

estimating a total time required to perform the virtual job request within the total available resources;

responsive to the job completion requirement set to require the return time in the job time limit, estimating a complete time required to output data calculated from said job within said grid environment to said client system;

adding said complete time to said total time required;

responsive to said total time required exceeding said job time limit, specifying an error and returning a no bid response to said client system; and responsive to said total time required not exceeding said job time limit, calculating a price for performing the job and returning a bid with the price to the client system.

2. The computer-implemented method according to claim 1 for determining said capacity of said grid environment to handle the job specified by the virtual job request, wherein receiving the virtual job request for processing the job within said grid environment at said bid controller via the network further comprises:

receiving said virtual job request for processing said job within one from among a plurality of grid environments for which said bid controller is enabled to automatically calculate bids.

3. A system for determining a capacity of a grid environment to handle a job specified by a virtual job request, comprising:

a bid controlled executing within a computing system on at least one processor communicatively connected to a network;

said bid controller further comprising:

means for receiving a virtual job request for processing a job within a grid environment, wherein said grid environment comprises a plurality of hardware resources, a plurality of software resources, and a plurality of network resources accessed from across a plurality of computing systems with each of said plurality of computing systems communicatively connected over said network through a grid management system to share said plurality of resources through a plurality of grid services, wherein said virtual job request specifies a job time limit which is a time limit for executing said job, an on demand eligibility of said job specifying an eligibility for execution on capacity on demand resources within said grid environment, a resource limit which is a limit on the amount of resources to allocate to said job, ajob completion requirement specifying whether the job time limit includes the time to return data output from said job to said client system, a software platform requirement of at least one required software platform class for said job from among a plurality of software platform classes available within said grid environment, a hardware platform requirement of at least one hardware class for said job from among a plurality of hardware platform classes available within said grid environment, a specified transport mechanism with a minimum transfer rate for data accesses for said job, a minimum data size for data processing of said job, a performance requirement for said job, and a grid sell off eligibility specifying whether sell off of said job to another grid environment is allowed;

means for determining by a total workload calculator a total resource requirement for said job from said job request of at least one required hardware resource, at least one required software resource, and at least one required network resource;

means for determining by an available resource calculator, a total available resources of a selection of resources currently available within said grid environment meeting said software platform requirement, said hardware platform requirement, said specified transport mechanism, said minimum data size, and said performance requirement for said job request from among said plurality of resources specified in a resource database specifying each type of resource, each resource performance specification, and each resource platform class from among said plurality of software classes and said plurality of hardware classes;

means, responsive to said total resource requirement requiring more resources than available in said total available resources and said on demand eligibility of said job set to allow capacity on demand resources, for adding a selection of available capacity on demand resources within said grid environment to said total available resources;

means responsive to said total resource requirement requiring more resources than available in said total available resources and said grid sell off eligibility set to allow sell off to another grid environment, for updating the total available resources with a selection of resource available if the virtual grid job is sold off to the another grid environment for processing;

means, responsive to said total available resources exceeding said resource limit, for limiting said total available resources by said resource limit;

means for estimating a total time required to perform the virtual job request within the total available resources;

means, responsive to the job completion requirement set to require the return time in the job time limit, for estimating a complete time required to output data calculated from said job within said grid environment to said client system;

means for adding said complete time to said total time required;

means, responsive to said total time required exceeding said job time limit, for specifying an error and returning a no bid response to said client system; and means, responsive to said total time required not exceeding said job time limit, for calculating a price for performing the job and returning a bid with the price to the client system.

4. The system according to claim 3 for determining said capacity of said grid environment to handle the job specified by the virtual job request, wherein said means for receiving the virtual job request for processing the job within said grid environment further comprises:

means for receiving said virtual job request for processing said job within one from among a plurality of grid environments for which said bid controller is enabled to automatically calculate bids.

5. A computer program product, residing on a volatile or non-volatile computer readable medium, when executing by a processor for determining a capacity of a grid environment to handle a job specified by a virtual job request, comprising:

means for enabling reception, from a client system via a network, of a virtual job request for processing a job within a grid environment, wherein said grid environment comprises a plurality of hardware resources, a plurality of software resources, and a plurality of network resources accessed from across a plurality of computing systems with each of said plurality of computing systems communicatively connected over said network through a grid management system to share said plurality of resources through a plurality of grid services, wherein said virtual job request specifies a job time limit which is a time limit for executing said job, an on demand eligibility of said job specifying an eligibility for execution on capacity on demand resources within said grid environment, a resource limit which is a limit on the amount of resources to allocate to said job, a job completion requirement specifying whether the job time limit includes the time to return data output from said job to said client system, a software platform requirement of at least one required software platform class for said job from among a plurality of software platform classes available within said grid environment, a hardware platform requirement of at least one hardware class for said job from among a plurality of hardware platform classes available within said grid environment, a specified transport mechanism with a minimum transfer rate for data accesses for said job, a minimum data size for data processing of said job, a performance requirement for said job, and a grid sell off eligibility specifying whether sell off of said job to another grid environment is allowed;

means for determining by a total workload calculator a total resource requirement for said job from said job request of at least one required hardware resource, at least one required software resource, and at least one required network resource;

means for determining, by an available resource calculator, a total available resources of a selection of resources currently available within said grid environment meeting said software platform requirement, said hardware platform requirement, said specified transport mechanism, said minimum data size, and said performance requirement for said job request from among said plurality of resources specified in a resource database specifying each type of resource, each resource performance specification, and each resource platform class from among said plurality of software classes and said plurality of hardware classes;

means, responsive to said total resource requirement requiring more resources than available in said total available resources and said on demand eligibility of said job set to allow capacity on demand resources, for adding a selection of available capacity on demand resources within said grid environment to said total available resources;

means responsive to said total resource requirement requiring more resources than available in said total available resources and said grid sell off eligibility set to allow sell off to another grid environment, for updating the total available resources with a selection of resource available if the virtual grid job is sold off to the another grid environment for processing;

means, responsive to said total available resources exceeding said resource limit, for limiting said total available resources by said resource limit;

means for estimating a total time required to perform the virtual job request within the total available resources;

means, responsive to the job completion requirement set to require the return time in the job time limit, for estimating a complete time required to output data calculated from said job within said, grid environment to said client system;

means for adding said complete time to said total time required;

means, responsive to said total time required exceeding said job time limit, for specifying an error and returning a no bid response to said client system; and means, responsive to said total time required not exceeding said job time limit, for calculating a price for performing the job and returning a bid with the price to the client system.

6. The computer program product according to claim 5 for determining said capacity of said grid environment to handle the job specified by the virtual job request, wherein said means for determining the total required workload for said virtual job request further comprises:

means for controlling calculation of a total time available for at least one from among executing said job within said grid environment, accessing data required for said job, and returning a result of said job from said grid environment to said client system.

* * * * *